United States Patent [19]

Vinciguerra

[11] 3,887,195

[45] June 3, 1975

[54] HIGH PRESSURE SHAFT SEAL DEVICE

[75] Inventor: Constantino Vinciguerra, Firenze, Italy

[73] Assignee: Nuovo Pignone, S.p.A., San Donato Milanese, Italy

[22] Filed: Apr. 24, 1973

[21] Appl. No.: 353,956

[30] Foreign Application Priority Data

Apr. 24, 1972  Italy................................. 23500/72

[52] U.S. Cl............................ 277/2; 277/3; 277/15; 91/396
[51] Int. Cl.............................................. F16j 9/00
[58] Field of Search................. 277/3, 15, 2; 91/396

[56] References Cited
UNITED STATES PATENTS

| | | | |
|---|---|---|---|
| 719,460 | 2/1903 | Goosmann | 277/3 |
| 787,136 | 4/1905 | Warren | 91/396 X |
| 3,176,996 | 4/1965 | Barnett | 277/2 |
| 3,209,830 | 10/1965 | Orr et al. | 277/2 |

FOREIGN PATENTS OR APPLICATIONS

| | | | |
|---|---|---|---|
| 324,763 | 2/1930 | United Kingdom | 277/3 |
| 554,094 | 6/1943 | United Kingdom | 277/15 |

*Primary Examiner*—Samuel B. Rothberg
*Attorney, Agent, or Firm*—Ralph M. Watson, Esq.

[57] ABSTRACT

A piston divides a high pressure cylinder into a forward and rear chamber. The forward chamber is charged with high pressure fluid from a blower whose shaft is to be sealed by oil. The rear chamber is charged with sealing oil and in communication with the shaft oil seal line. A rod extends from the face of the plunger facing the rear chamber through an aperture in the wall of the cylinder and provides a differential effective area across the piston. The piston is responsive to and maintained in a balance position in the cylinder by the opposing pressure forces, and the pressure in the rear chamber is greater than the forward chamber. The rod has an outwardly tapered portion at its free end which cooperates with the aperture to regulate the oil pressure.

3 Claims, 4 Drawing Figures

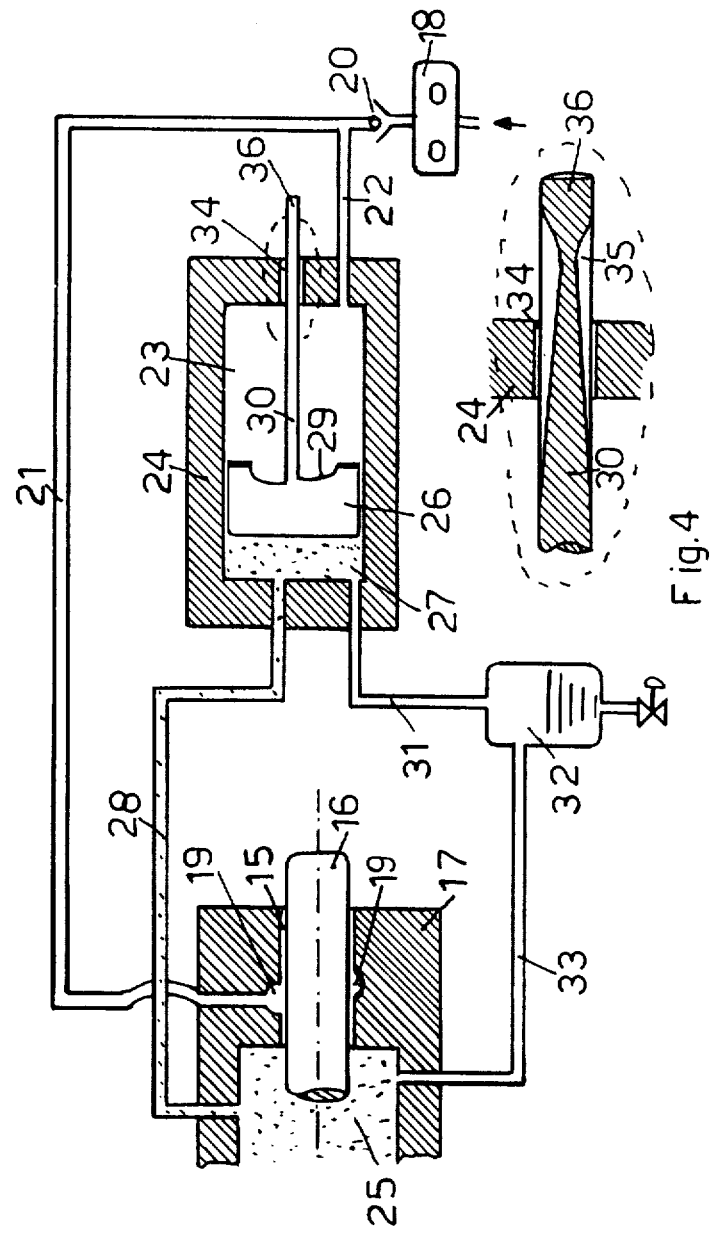

HIGH PRESSURE SHAFT SEAL DEVICE

The present invention relates to a device acting as a high pressure oil accumulator and as a regulator of said oil high pressure, particularly suitable for use with the oil seals of high pressure working centrifugal blowers, said device being located at the same level of the blower.

BACKGROUND OF THE INVENTION

The centrifugal blowers with the highest delivery pressures used at the present time (e.g., blowers for use in ammonia, urea or methanol synthesis) work with delivery pressures of about 400 to 600 atm. and are equipped with oil closings at the ends of the rotors seals. In these types of seals a closing oil is directed into a middle zone of the seal with a slightly higher pressure than the pressure of the gas to be sealed, so that the gas cannot flow out through the seal. The closing oil is then subdivided into two parts. One part of the flow is very small due to the small pressure difference and flows inside the blower, while the other part flows outside said blower.

Now, in these seals two essential conditions are required, i.e. the closing oil must always be slightly higher in pressure than the pressure of the gas to be sealed and, in the case of a breakage of the oil feeding pumps, an oil accumulator must continue to send the oil to the seals during the entire stop time of the blower (one or two minutes). The accumulator is located at the upstream side of the seal circuit.

PRIOR ART

The seal circuits known by the prior art are of the types schematiclly shown in FIGS. 1 and 2.

In the circuit of FIG. 1 oil feeding pumps 1 (two pumps in parallel) send the closing oil through a check valve 2 to the middle zone of a seal 3 of rotor 4 of a centrifugal blower 5. Oil is also sent to an accumulating chamber 6 containing in its upper part a rubber pocket 7 full of oil. The pocket 7 communicates with a second chamber 8 connected to zone 9, wherein there is the gas to be sealed. The oil level in chamber 8 is kept constant by a controlling system 10, which operates a by-pass valve 11. In fact, if the feeding pumps send too much closing oil, the latter, by compressing rubber pocket 7, gives rise to an increase of the level of the oil contained in chamber 8, and, hence, there is the intervention of the level regulator 10, which opens by-pass valve 11. Likewise, valve 11 is closed when the closing oil quantity sent by the pumps is lacking and therefore the oil level in chamber 8 is lowered. In the case of a breakage of the pumping system, the blower is stopped and the oil accumulating chamber 6 continues to send the closing oil to the seal during the entire stop time. The oil is being prevented from flowing back toward the pumps by the check valve 2. Rubber pocket 7 acts as a separating surface between the closing oil and the oil in chamber 8 which may be polluted by the gas to be sealed by the oil. In such a way the closing oil is not contaminated with gas traces which could reduce the seal effectiveness. Chambers 6 and 8, finally, are located at a certain height h of 4 to 5 m above the blower seals so that the desired pressure difference between the closing oil and the gas to be sealed is assured.

In the circuit of FIG. 2, wherein the elements like to the ones of the circuit of FIG. 1 are marked by the same numbering, the oil pressure control is provided made by a by-pass valve 12 sensitive to the pressure of the gas to be sealed in chamber 9. The oil accumulating chamber 13, which also is located at a height h of 4 to 5 m above the blower seals in order to assure the desired pressure difference between the closing oil and the gas to be sealed, is then in contact with the gas to be sealed. Such contact dictates against the use of this type circuit when the gas to be sealed is miscible with the closing oil. The closing oil fills chamber 13 and cannot exceed the upper hole of said chamber due to the action of a suitable valve 14. In the case of a pump stoppage, chamber 13 acts as a oil supply for the seals during the stop time of the blower.

SUMMARY OF THE INVENTION

From what said it will be clearly understood that, in oil sealing circuits for centrifugal blower used up to now the function of accumulating the closing oil and of controlling the pressure of the oil is fulfilled by two distinct elements, while a higher pressure of the closing oil as compared to the pressure of the gas to be sealed is obtained by locating the oil accumulator at a certain height above the seals.

A feature of the present invention is to provide a single extremely simple, functional and inexpensive device which fulfils the twofold function of accumulating the oil and of controlling the pressure, keeping the closing oil separated from the gas to be sealed, thus allowing an effective seal, and above all producing the desired pressure difference even if the device is located at the same level as the blower seals.

Another feature of the present invention is to provide a device which is particularly fitted to seal with oil centrifugal blowers working with higher delivery pressures than the blowers used up to now, such as the centrifugal blowers for producing polyethylene from ethylene which operate at a pressure of more than 2,000 atm., wherein there is the necessity of oil closing with an oil pressure of more than 700 atm. In this case, in fact, the circuits used up to now and above explained are unfit since it is not possible to find containers with rubber pockets (circuit of FIG. 1) which assure safe operation with these pressures. Furthermore the gas to be sealed cannot be allowed to come in contact with the closing oil as in the circuit of FIG. 2, due to the high miscibility of the gas in the oil at these high pressures. On the other hand, since high working pressures require closing oil pressure which has to be greater than the pressure of the gas to be sealed, the eventual oil accumulating containers should be located at a height of some 10's of meters above to the seals with consequently very great difficulties due to the considerable weight of the containers and to the remarkable load losses in the connection pipe given the fact that the oil viscosity increases with the pressure according to an exponential curve.

The accumulating and controlling device according to the present invention consists of a strong metallic cylinder divided into two chambers by a plunger, the front chamber of the cylinder being connected to the chamber of the gas to be sealed while the rear chamber of the cylinder acts as an oil accumulator and is filled with the closing oil. The device acts as a pressure regulator in that, according to the invention, to the rear face of the plunger there is fixed a rod extending out of the rear face of the cylinder through an annular port. The port acts as an outlet for the excess oil. The rod includes at its free end longitudinal grooves shaped in such a way to progressively increase the opening of the outlet and hence the quantity of the discharged oil when the plunger moves towards the front face of the cylinder. In such a way, in fact, the plunger stops in a position where the opening of the outlet is such that the quantity of discharged oil for seal requirements equalizes the excess oil. In the case of an inefficiency (breakage) of the feeding pumps, i.e., when there is no more said oil feeding to the said rear portion of the oil accumulating chamber of the cylinder, the plunger moves towards the rear face of the cylinder and closes the outlet opening so that the entire oil inventory in the rear chamber is supplied to the blower seals during the time required for stopping the blower. Finally, the required overpressure of the closing oil as compared to the pressure of the gas to be sealed is obtained, according to the invention, also when the device is located at the same level as to the blower seals. This is a result of the effective areas of the front and rear faces of the plunger, whereon there are the forces of the pressures of the gas to be sealed and of the closing oil respectively. These areas differ from each other as a result of the cross sectional area of the plunger rod which reduces the effective area of the rear face hence the desired overpressure of the closing oil can be kept at a value through suitable sizing of the rod area.

On the other hand the overpressure prevents the gas from entering the rear oil accumulating chamber of the cylinder, while the whole small quantity of closing oil entering the front chamber is conveyed to a semiautomatic discharge. Hence there is a clean separation between the closing oil and the gas to be sealed.

The invention will be now explained hereinafter with reference to the accompanying drawings showing a preferred realization given as a non-limitative example since technique and constructive variations may be always made without departing from the range of the present invention.

BRIEF DESCRIPTION OF THE DRAWINGS

FIG. 3. shows schematically a sectional view of the circuit for sealing with closing oil the centrifugal blowers by making use of the accumulating and controlling device according to the present invention;

FIG. 4 shows an enlarged longitudinal section of the end part of the plunger rod of the device according to the present invention.

DETAILED DESCRIPTION OF A PREFERRED EMBODIMENT

Figure 1:
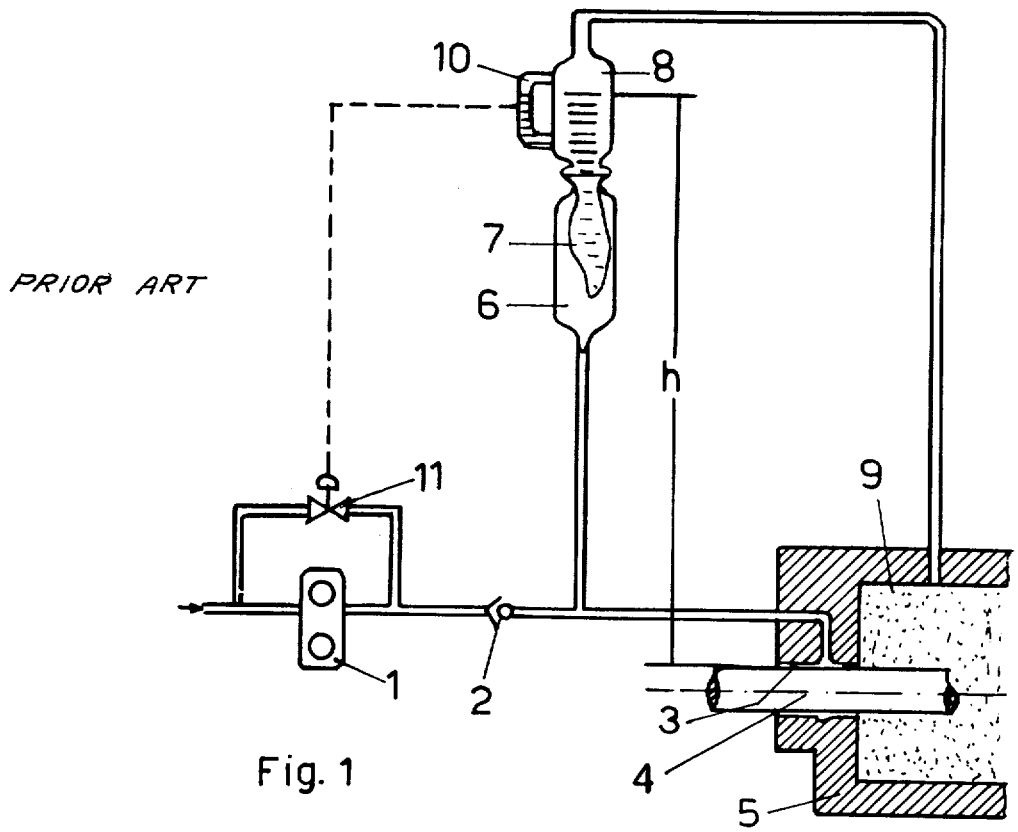
FIG. 1 shows schematically a sectional view of a circuit for sealing with closing oil the centrifugal blowers according to the prior art.
Figure 2:
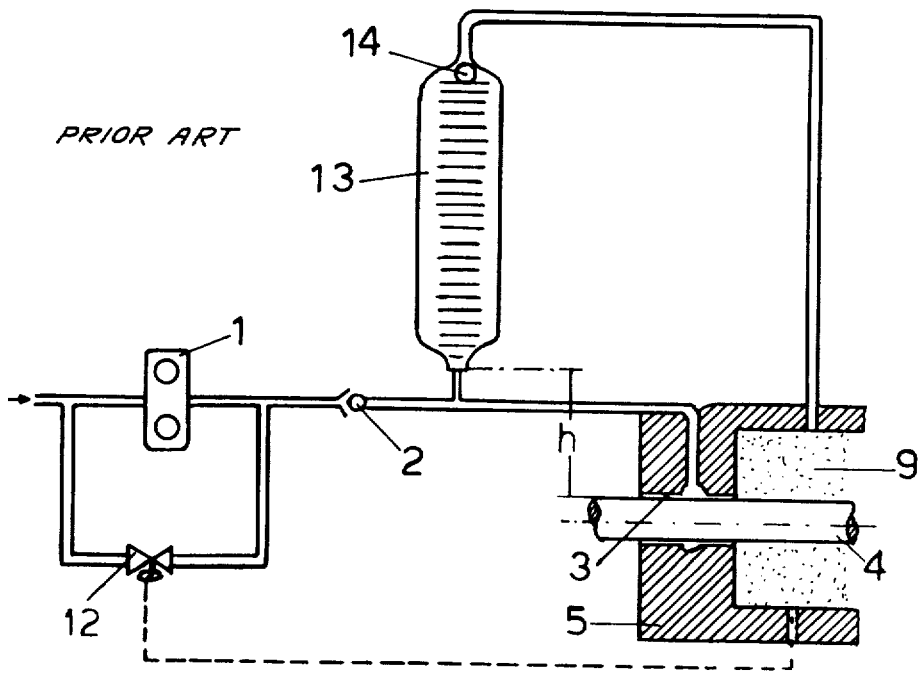
FIG. 2 shows schematically a sectional view of another circuit for sealing with closing oil the centrifugal blowers according to the prior art too.

Referring now to FIG. 3, numeral 15 indicates an oil seal for a rotor 16 of a high pressure working centrifugal blower 17.

Feeding pumps 18 (two pumps in parallel) send closing oil from a source (not shown) into the middle zone 19 of seal 15 through a check valve 20 and a duct 21. The closing oil pumped by feeding pumps 18 is also sent, through duct 22, into the rear chamber 23 of a high pressure, metallic cylinder 24 having the twofold function. Cylinder 24 acts as an accumulator of the closing oil and maintains the pressure of oil at a slightly higher value as compared to the pressure of the gas to be sealed in chamber 25 of the blower. Rear chamber 23 of cylinder 24, which constitutes the oil accumulator, is separated by a plunger 26 from the front chamber 27 of cylinder 24. Front chamber 27 in turn is in fluid communications with chamber 25 through a duct 28. The pressures of the gas and of the closing oil will act and compensate each other hence against the front and the rear faces respectively of plunger 26. Since, however, a rod 30 is fixed to the rear face 29 of plunger 26, the effective area whereon the pressure $Po$ of the closing oil acts will be given by the difference between the area $Sp$ of the plunger cross section and the area $Sd$ of the cross section of said rod, i.e. by $(Sp-Sd)$, while the effective area whereon the pressure $Pg$ of the gas to be sealed acts will be given by the area $Sp$ of the plunger cross section. Now, at the equilibrium the condition $Po(Sp-Sd) = Pg\ Sp$ has to happen, the pressure $Po$ of the closing oil will be always higher than the pressure $Pg$ of the gas to be sealed independent of the level at which cylinder 24 will be located relative to seal 15 (cylinder and seal may be located also at the same level) and the overpressure will be proportional to area $Sd$ of rod 30.

From the foregoing it will be understood that a particular overpressure value of the oil relative to the gas may be produced and preserved by way the area $Sd$ of rod 30 of plunger 26. The overpressure keeps the gas separated from the closing oil by preventing the gas from flowing into the rear chamber 23, while the small leaks of the closing oil from chamber 23 into the front chamber 27 containing the gas are conveyed through a duct 31 to a semiautomatic discharger 32 together with the small leaks of the closing oil from the seal, i.e. with the closing oil which flows from seal 15 into chamber 25 of the blower. The oil from chamber 25 is conveyed to discharger 32 through the duct 33.

Furthermore rod 30 of plunger 26 extends outwardly from cylinder 24 through an annular port 34 which acts as an outlet for the excess oil. To this end rod 30 includes at its free end (see specifically FIG. 4) longitudinal grooves 35 tapering toward the outside of the cylinder so that there is a gradual increase of the opening of said outlet and hence of the quantity of the discharged oil when plunger 26 moves towards the front face of cylinder 24 (to the left). When cylinder 24 is located at the same level of seal 15, the device 24 acts also as a regulator of the oil pressure since plunger 26 stops in a position which gives rise to a discharge of oil. Corresponding to the seal requirements. In fact, an increase or decrease in the quantity of pumped oil relative seal oil requirements causes a shifting of plunger 26 to the left or to the right, respectively, and consequently a greater opening or closing of the said outlet. On the other hand, in the case of a breakage of the feeding pumps 18, since oil is not pumped into chamber 23, plunger 26 shifts to the right. The outlet is consequently closed and all the closing oil contained into rear chamber 23 is supplied to seal 15 during the time required for stopping the blower.

Furthermore, it will be clearly understood that, since rod 30 of plunger 26 comes out of cylinder 24 with its end part 36, the rod may be utilized also for visually checking the oil level and for operating, if necessary, suitable alarm systems. Further instead of the tapered grooves 35 on the plunger rod, similar elements capable of progressively increase the outlet opening when the plunger moves toward the front face of cylinder 24 may also be used.

What is claimed is:

1. A device for accumulating and regulating high pressure oil for use in an oil shaft seal of a high working pressure gas blower, comprising:

a high pressure metallic cylinder; a piston slidably positioned within said cylinder and dividing the interior thereof into a first chamber and second chamber; means for maintaining the first chamber in fluid communication with and charged by the gas in the blower; pump means for supplying high pressure oil from a source, conduit means for delivering said high pressure oil to said shaft seal, said conduit means including a, branch line for delivering high pressure oil to said second chamber, and means located upstream of the branch line junction for preventing back flow of oil to said pump means, the cylinder defining a regulating port aligned with and in fluid communication with said second chamber; said piston having a rod extending therefrom through said port, said rod providing a differential pressure area across said piston to cause said second chamber to have a greater pressure than said first chamber, whereby gas is prevented from leaking into the second chamber; said rod further having an outwardly tapered cross-section adjacent its free end, whereby the rod cooperates with the port to vary the flow of oil therethrough in response to movement of said piston, said port being adapted to be closed when said pump means fails to deliver pressurized oil and the oil within said second chamber being delivered to the seal by the movement of the piston under influence of gas pressure in said first chamber.

2. A device according to claim 1, wherein the free end of the rod extends beyond said cylinder through said port to act as a visual check of the oil, the rod extension being proportional to volume of oil in the second chamber.

3. A device according to claim 1 wherein said gas pressure is greater than 2,000 atm.

* * * * *